Figure 1:
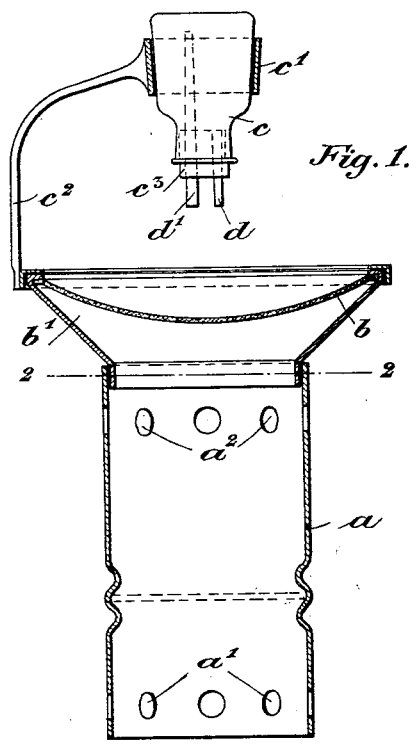

(No Model.)

H. OPPERMANN & R. GOEHDE.
DISINFECTING COMPOUND AND APPARATUS FOR APPLYING SAME.

No. 591,683.  Patented Oct. 12, 1897.

Witnesses:
Herbert Bradley
Fred R. Preston

Inventors.
Heinrich Oppermann.
Richard Goehde.

By Knight Bros
Atty's

UNITED STATES PATENT OFFICE.

HEINRICH OPPERMANN, OF BERNBURG, AND RICHARD GOEHDE, OF BERLIN, GERMANY.

DISINFECTING COMPOUND AND APPARATUS FOR APPLYING SAME.

SPECIFICATION forming part of Letters Patent No. 591,683, dated October 12, 1897.

Application filed December 11, 1896. Serial No. 615,370. (No model.)

*To all whom it may concern:*

Be it known that we, HEINRICH OPPERMANN, doctor of philosophy, residing at Bernburg, in the Duchy of Anhalt, and RICHARD GOEHDE, of Berlin, German Empire, subjects of the King of Prussia, German Emperor, have invented new and useful Improvements in Sterilizing Apparatus, of which the following is a specification.

The present invention relates to the utilization of formic aldehyde for sterilizing purposes; and it has for its object to do away with the inconveniences in the use as hitherto made of said substance as a sterilizing agent.

As is well known, formic aldehyde is a very powerful sterilizing agent, but, being a gaseous fluid, it cannot be sold through the agency of apothecaries and druggists—as, for instance, is the case with carbolic acid. Hence where formic aldehyde is desired to exert its sterilizing power it has to be prepared by the employer. This is done by allowing methylic alcohol to vaporize and conducting the vapors over platina-black, whereby the alcoholic vapors are decomposed into formic aldehyde and water. It is obvious that with this procedure, apart from economy, there is no possibility of controlling and properly regulating the production and action of the agent. On the other hand, formic aldehyde being to some extent soluble in water the employment of said aldehyde in the form of a watery liquor has been induced, said liquor being known in the commerce as "formaline;" but that watery liquor contains a comparatively small percentage only of formic aldehyde, and hence is not well adapted for vaporization. In general formaline is applied in the form of a spray. Besides the inconveniences cited, which adhere to the physical conditions of the agents, there is another which is a very serious one—that is to say, formic aldehyde has the property of easily affecting the mucous membranes, whereby its use is bound to very small quantities and special precaution. All those inconveniences are overcome by the present invention, which enables formic aldehyde to be applied in the state of a readily and completely vaporizable liquor rich in formic aldehyde, and in which the same is combined with other agents, whereby the vapors are rendered harmless to mucous membranes without affecting their sterilizing power.

The invention comprises the new liquor, the method of preparing the liquor, and a vaporizing apparatus for diffusing the same.

The new sterilizing liquor consists in a solution of formic aldehyde in methylic alcohol which also contains in solution a camphor capable of neutralizing the action of the aldehyde on mucous membranes, such as menthol and its known equivalents. The proportion of said camphor in relation to the formic aldehyde may vary within wide limits, depending upon the special circumstances under which the liquor is to be made use of. For instance, if a room is to be sterilized while occupied by persons a liquor is employed which contains a large proportion of menthol. In general we prefer to provide for in the liquor as much formic aldehyde as is capable of being absorbed by the dissolvent, so as to dispose of a saturated solution, and to regulate the admixture of menthol according to circumstances. As known, methylic alcohol dissolves as much as sixty per cent. of formic aldehyde.

The method of preparing the liquor consists in forming a mixture of formic aldehyde and menthol by means of methylic alcohol, being a dissolvent for both. This may be done by first causing methylic alcohol to absorb gaseous formic aldehyde until saturation is reached and then adding the required proportion of menthol, or the latter may first be dissolved in methylic alcohol and then this solution saturated with formic aldehyde. Obviously the liquid need not be saturated with formic aldehyde.

The described liquor is adapted for sterilizing rooms as well as such objects and products as are not chemically affected by formic aldehyde. It is brought into action by subjecting it to vaporization within the room to be sterilized or by vaporizing it and conducting the vapors to the object or product to be acted upon.

On the annexed sheet of drawings is represented a vaporizer adapted for use in rooms and which is so devised that it produces a rapid vaporization of a small quantity of liquor which is automatically renewed in short intervals.

Figure 2:
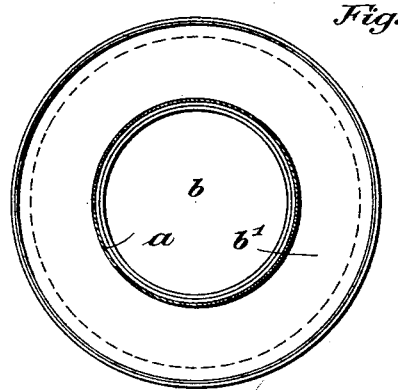

Figure 1 is a sectional elevation of the said vaporizer, and Fig. 2 a horizontal section on line 2 2, Fig. 1, seen from below.

The apparatus consists in the combination of a vaporizing-plate with a heating device arranged below and a liquor-supply arranged above.

In the figures the heating device is supposed to be a gas-burner surrounded with a mantle $a$, of sheet metal, having orifices $a'$ at the bottom for the admission of air and orifices $a^2$ at the top for the exit of the combustion products.

$b$ is the vaporizing-plate, preferably of circular shape. The same is constructed of a refractory material which is sufficiently porous for readily absorbing liquid, so that the latter is exposed in a state of minute subdivision to the action of the heat. We prefer to construct the plate $b$ with asbestos felt or asbestos cloth. Moreover, it has been found advantageous to use a plate having a dish form, as represented in Fig. 1. The plate is held in place by being secured with its edge to the upper edge of an inverted truncated cone $b'$, of sheet metal, the under part of which is cylindrical, so as to tightly fit into the mantle $a$, in the upper end of which it is inserted. Thus the cone $b'$ forms a heating-chamber closed at the top by the vaporizing-plate $b$.

At a convenient distance above the vaporizing-plate is arranged a vessel or reservoir $c$, which contains a provision of liquor and is combined with a device for causing the liquor to fall drop by drop to the asbestos plate $b$. By virtue of the porous condition of said plate the drop in reaching it is at once absorbed, and being thus exposed in a state of very fine subdivision to the action of the heat it is rapidly and completely vaporized.

In the apparatus shown the reservoir $c$ consists in a small inverted glass flask closed by a stopper $c^3$ and held in a ring $c'$, fixed to the cone $b'$ by means of the arm $c^2$. The flask is not completely filled with liquor, so that an empty space exists at the top. The stopper is provided with two bores, and through these are inserted two small glass tubes $d$ and $d'$, which are open at both ends. The tube $d$ is short, so that its inner end does not project beyond the inner surface of the stopper, while the tube $d'$ has such a length that its inner end projects beyond the highest level of the liquor into the said empty space. Under the action of gravity liquor descends through tube $d$ and accumulates at the outer opening of same as a drop, which will finally be detached by its own weight and fall to the plate $b$, where it is vaporized. As the outer air has free access through the tube $d'$ to the empty space above the level of the liquor the latter is allowed to exude drop for drop from the lower end of the tube $d$.

It is obvious that the reservoir may be combined with a different form of drop-meter.

The described process may be availed of for the preparation of liquors with other gaseous agents, and the described apparatus may be used with such different liquors.

We claim as our invention—

1. As a new compound for sterilizing purposes a liquor composed of formic aldehyde as sterilizing agent, menthol as neutralizer of the bad effect of said aldehyde upon mucous membranes, and methylic alcohol as solvent for both, substantially as described.

2. The combination, with a heater; of a refractory porous vaporizing-plate, a reservoir arranged above said plate for containing a provision of liquor, and a device for causing the liquor to regularly drop from the reservoir to the said porous vaporizing-plate comprising a stopper for closing the reservoir provided with bores and long and short tubes inserted in the bores thereof; substantially as described.

In testimony whereof we have hereunto set our hands in the presence of two subscribing witnesses.

HEINRICH OPPERMANN.
RICHARD GOEHDE.

Witnesses:
W. HAUPT,
HENRY HASPER.